US012394931B2

(12) United States Patent
Komoto et al.

(10) Patent No.: US 12,394,931 B2
(45) Date of Patent: Aug. 19, 2025

(54) CONNECTOR

(71) Applicant: Japan Aviation Electronics Industry, Limited, Tokyo (JP)

(72) Inventors: Tetsuya Komoto, Tokyo (JP); Osamu Hashiguchi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 337 days.

(21) Appl. No.: 18/143,303

(22) Filed: May 4, 2023

(65) Prior Publication Data

US 2024/0072481 A1 Feb. 29, 2024

(30) Foreign Application Priority Data

Aug. 25, 2022 (JP) ................................ 2022-133968

(51) Int. Cl.
*H01R 13/00* (2006.01)
*H01R 13/436* (2006.01)
*H01R 13/72* (2006.01)
*H01R 13/74* (2006.01)
*H01R 107/00* (2006.01)

(52) U.S. Cl.
CPC ......... *H01R 13/4367* (2013.01); *H01R 13/72* (2013.01); *H01R 13/74* (2013.01); *H01R 2107/00* (2013.01); *H01R 2201/12* (2013.01)

(58) Field of Classification Search
CPC ................................ H01R 13/72; H01R 13/74
See application file for complete search history.

(56) References Cited

U.S. PATENT DOCUMENTS 7,559,769 B2 * 7/2009 Hsiao .................. H05K 7/1069 439/700
9,088,083 B2 * 7/2015 Mason ............... H01R 13/2435
9,595,773 B2 * 3/2017 Hemmi ..................... H01R 4/48
9,797,925 B2 * 10/2017 Teranishi ........... G01R 1/06738
11,387,587 B1 * 7/2022 Ramsey ............. H01R 13/2421
12,259,406 B2 * 3/2025 Liu .................... G01R 1/06722
2018/0233854 A1 8/2018 Komoto et al.
2024/0072481 A1 * 2/2024 Komoto ............. H01R 12/7011

FOREIGN PATENT DOCUMENTS

EP 3376601 A1 9/2018
EP 3739689 A1 11/2020
JP 2018129244 A 8/2018

* cited by examiner

*Primary Examiner* — Phuong Chi Thi Nguyen
(74) *Attorney, Agent, or Firm* — MUNCY, GEISSLER, OLDS & LOWE, P.C.

(57) ABSTRACT

The connector includes an inner contact formed of a plate member inserted into a recess of a plug contact, the plate member having a first constituent portion including an elastically displaceable contact portion and a second constituent portion including a pressing portion that is elastically displaceable independently of elastic displacement of the contact portion, part of a sheet-like connection target in which a flexible conductor is exposed on at least one surface being sandwiched between the pressing portion and an inner surface of the recess in a direction orthogonal to the fitting axis, the inner surface of the recess coming into contact with a front surface of the connection target while the pressing portion coming into contact with a back surface of the connection target.

11 Claims, 17 Drawing Sheets

CONNECTOR

BACKGROUND OF THE INVENTION

The present invention relates to a connector, particularly to a connector to be connected to a sheet-like connection target in which a flexible conductor is exposed on at least one surface.

These days, what is called smart cloth, which can acquire biological information of a user such as a heart rate or a body temperature simply by being worn, has attracted attention. The smart cloth includes an electrode placed at a measurement point, and, by electrically connecting a wearable device as a measurement instrument to the electrode, biological information can be transmitted to the wearable device.

The connection between the electrode and the wearable device can be made by, for example, using a connector to be connected to a flexible conductor drawn out from the electrode.

As a connector of this type, for example, a connector like that shown in FIG. 35 is disclosed in JP 2018-129244 A. The connector includes a housing 2 and a base member 3 separately placed on both sides of a flexible substrate 1 to sandwich the flexible substrate 1 therebetween; in the connector, a cylindrical portion 4A of a contact 4 is passed through a contact through hole 2A of the housing 2, and a flange 4B of the contact 4 is sandwiched between the housing 2 and a flexible conductor 1A exposed on a surface of the flexible substrate 1.

By pushing the base member 3 toward the housing 2 in this state, as shown in FIG. 36, a protrusion 3A of the base member 3 is inserted into a protrusion accommodating portion 4C of the contact 4 with the flexible substrate 1 being interposed therebetween, and the inner surface of the protrusion accommodating portion 4C comes into contact with the flexible conductor 1A with a predetermined contact force, whereby the contact 4 is electrically connected to the flexible conductor 1A.

Further, as shown in FIG. 35, housing fixing posts 3B formed to protrude on the base member 3 are press-fitted into post accommodating portions 2B of the housing 2, whereby the housing 2 and the base member 3 are fixed to each other.

By fitting a wearable device to the connector disclosed in JP 2018-129244 A, the wearable device can be connected to an electrode made of a flexible conductor.

However, there is a problem that, when a flexible conductor 1B is exposed on the back surface of the flexible substrate 1, the flexible conductor 1B cannot be electrically connected to the contact 4 in the connector of JP 2018-129244 A.

SUMMARY OF THE INVENTION

The present invention has been made to solve such an existing problem, and an object of the present invention is to provide a connector capable of electrically connecting a contact to a flexible conductor of a connection target regardless of whether the flexible conductor is exposed on the front surface or the back surface of the connection target.

The connector according to the present invention includes:

a plug contact of cylindrical shape, the plug contact being conductive and having a recess extending along a fitting axis; and an inner contact formed of a plate member, the inner contact being conductive and inserted into the recess, wherein the plate member includes:

a first constituent portion including a contact portion that is elastically displaceable in a direction orthogonal to the fitting axis and that comes into contact with the plug contact in the recess;

a second constituent portion including a pressing portion that is elastically displaceable in a direction orthogonal to the fitting axis independently of elastic displacement of the contact portion of the first constituent portion; and a coupling portion that couples the first constituent portion and the second constituent portion such that the first constituent portion and the second constituent portion are apart from each other along the fitting axis, and part of a connection target of sheet-like shape in which a flexible conductor is exposed on at least one surface is sandwiched between the pressing portion and an inner surface of the recess in a direction orthogonal to the fitting axis, and the inner surface of the recess comes into contact with a front surface of the connection target while the pressing portion comes into contact with a back surface of the connection target, whereby the plug contact is directly electrically connected to the flexible conductor in a case where the flexible conductor is exposed on the front surface of the connection target, and the plug contact is electrically connected to the flexible conductor via the inner contact in a case where the flexible conductor is exposed on the back surface of the connection target.

DETAILED DESCRIPTION OF THE INVENTION

Hereinbelow, embodiments of the present invention are described on the basis of the accompanying drawings.

Embodiment 1

Figure 1:
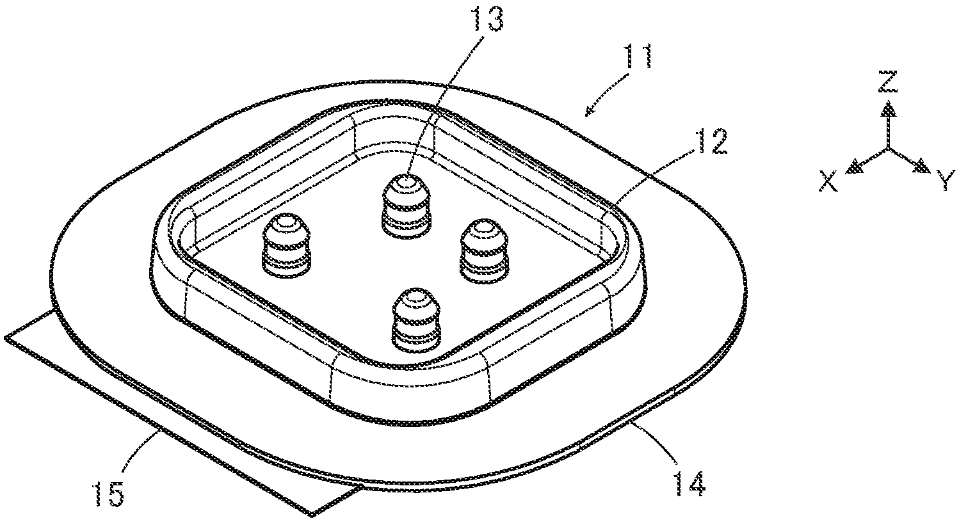
FIG. 1 is a perspective view showing a connector according to Embodiment 1.

FIG. 1 shows a connector 11 according to Embodiment 1. The connector 11 is used as, for example, a garment-side connector for fitting a wearable device, and includes a housing 12 made of an insulating material. Four plug contacts 13 are held in the housing 12, and a reinforcing sheet 14 and a sheet-like conductive member 15 are further held by the housing 12 while being stacked with each other. The sheet-like conductive member 15 constitutes a connection target to which the connector 11 is connected.

The four plug contacts 13 are arranged in two rows parallel to each other in such a manner as to protrude perpendicularly to the sheet-like conductive member 15.

Here, for the sake of convenience, it is assumed that the reinforcing sheet 14 and the sheet-like conductive member 15 extend along an XY plane, the arrangement direction of the four plug contacts 13 is referred to as a Y direction, and the direction in which the four plug contacts 13 protrude is referred to as a +Z direction. The Z direction is a fitting direction in which the connector 11 is fitted to a counter connector.

Figure 2:
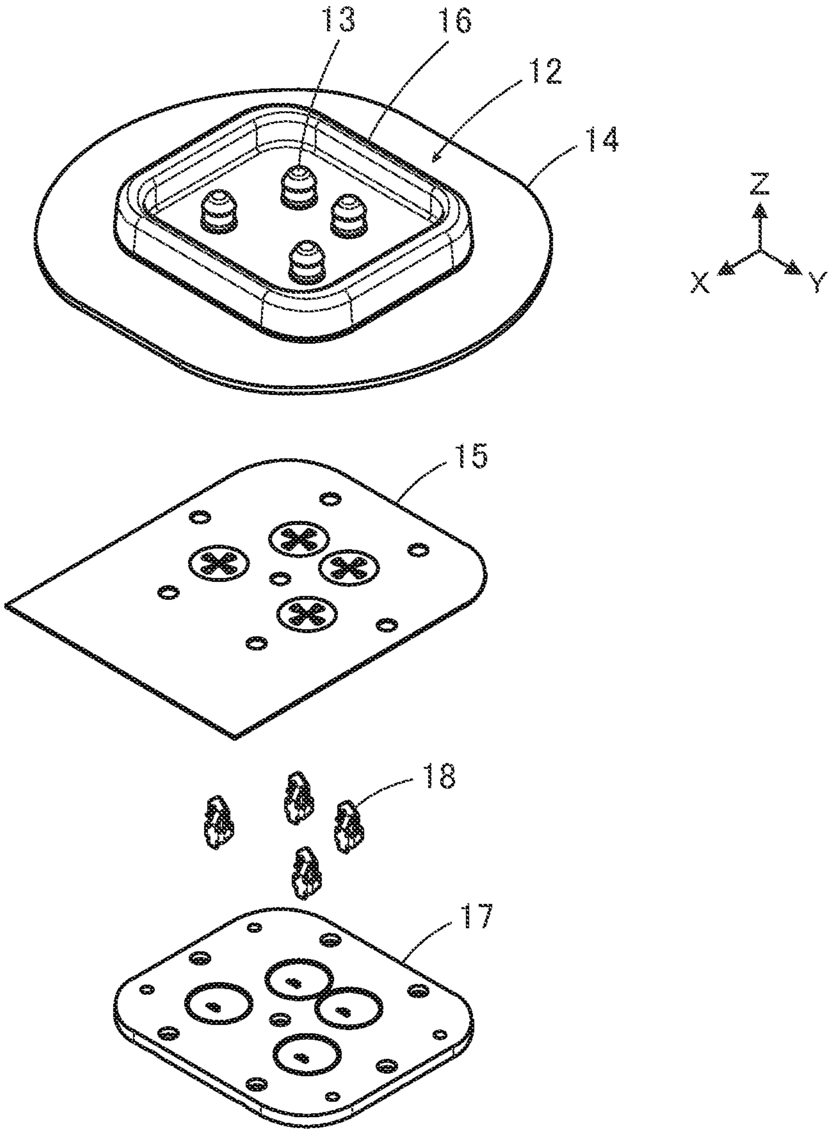
FIG. 2 is an exploded perspective view of the connector according to Embodiment 1 as viewed obliquely from above.
Figure 3:
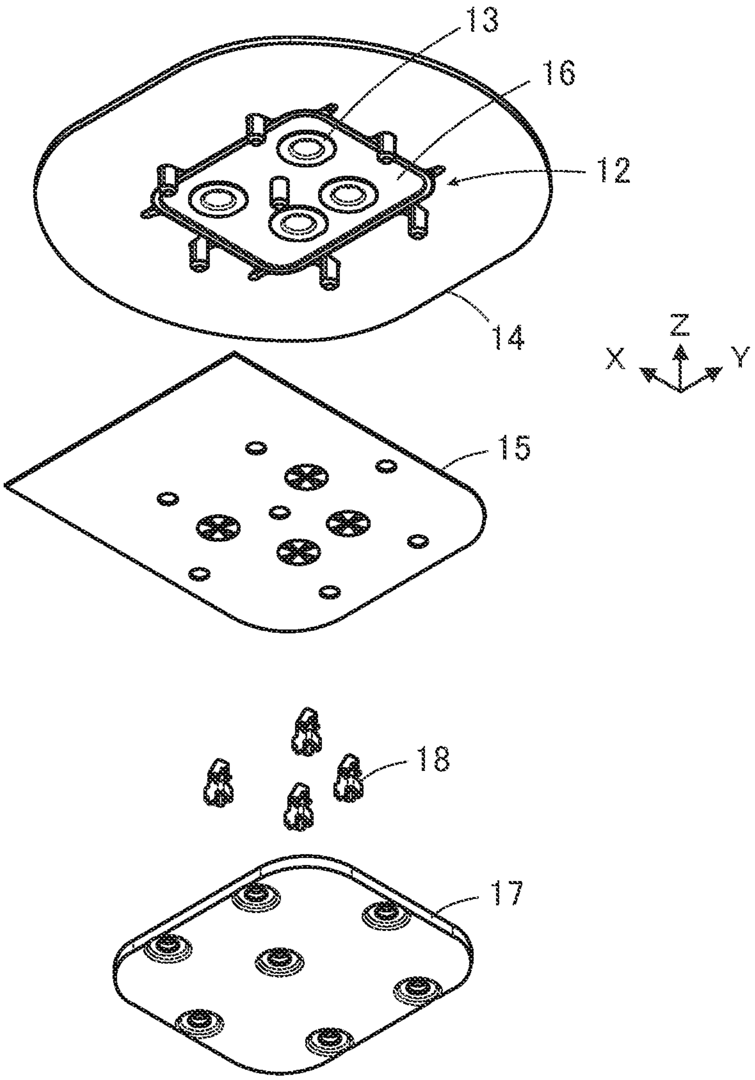
FIG. 3 is an exploded perspective view of the connector according to Embodiment 1 as viewed obliquely from below.

FIGS. 2 and 3 show exploded perspective views of the connector 11. The connector 11 includes a top insulator 16 and a bottom insulator 17, and the top insulator 16 and the bottom insulator 17 constitute the housing 12.

The four plug contacts 13 are held in the top insulator 16, the reinforcing sheet 14 is placed on the back surface on the −Z direction side of the top insulator 16, and the sheet-like conductive member 15 is placed on the −Z direction side of the reinforcing sheet 14. Four inner contacts 18 are placed on the −Z direction side of the sheet-like conductive member 15, and the bottom insulator 17 is placed on the −Z direction side of the inner contact 18. The four inner contacts 18 correspond to the four plug contacts 13.

Figure 4:
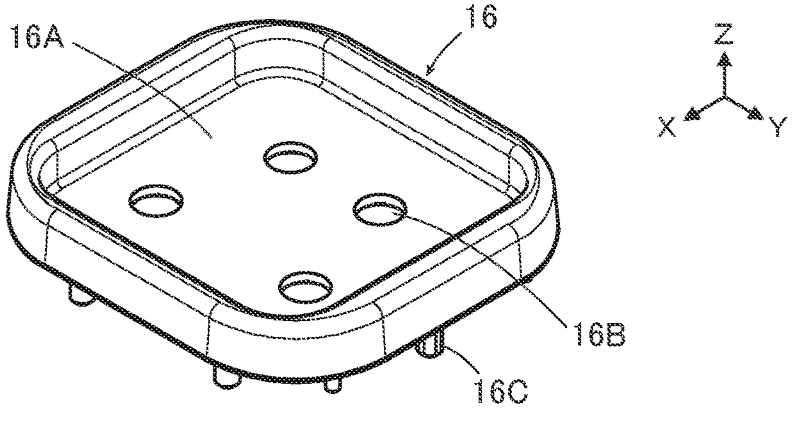
FIG. 4 is a perspective view showing a top insulator used for the connector of Embodiment 1.

As shown in FIG. 4, the top insulator 16 has a recess 16A opened in the +Z direction and four contact through holes 16B formed in the recess 16A. The recess 16A constitutes a counter connector accommodating portion in which part of a not-illustrated counter connector is accommodated, and the four contact through holes 16B correspond to the four plug contacts 13. A plurality of bosses 16C protruding in the −Z direction are formed on the surface oriented in the −Z direction of the top insulator 16.

Figure 5:
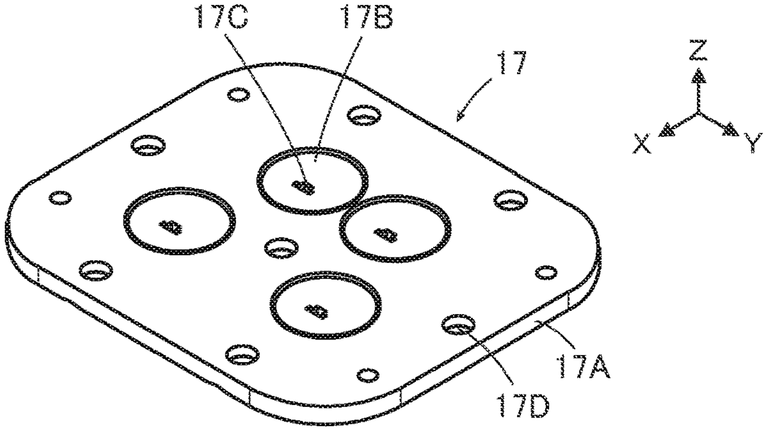
FIG. 5 is a perspective view showing a bottom insulator used for the connector of Embodiment 1.

As shown in FIG. 5, the bottom insulator 17 has a flat plate portion 17A, and four circular recesses 17B opened in the +Z direction are formed in the flat plate portion 17A. The four recesses 17B correspond to the four plug contacts 13. A holding hole 17C for holding the inner contact 18 is formed in each of the four recesses 17B.

A plurality of through holes 17D corresponding to the plurality of bosses 16C of the top insulator 16 are formed in the flat plate portion 17A.

Each of the four plug contacts 13 is formed of a conductive material such as metal, and is connected to the corresponding contact of the not-illustrated counter connector when part of the counter connector is accommodated in the recess 16A of the top insulator 16.

Figure 6:
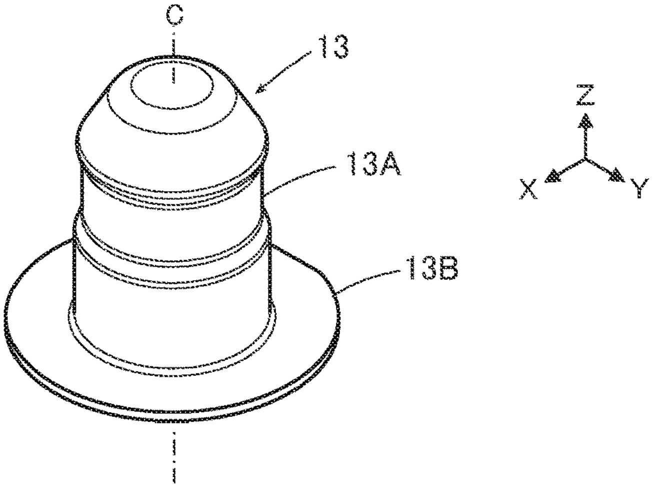
FIG. 6 is a perspective view showing a plug contact used for the connector of Embodiment 1.
Figure 7:
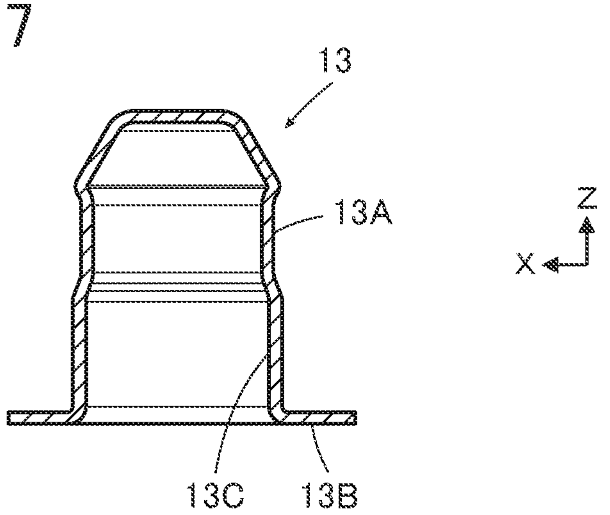
FIG. 7 is a cross-sectional view showing the plug contact used for the connector of Embodiment 1.

As shown in FIG. 6, the plug contact 13 has a cylindrical portion 13A in a circular cylindrical shape extending in the Z direction along a fitting axis C and a flange 13B extending along an XY plane from an end portion in the −Z direction of the cylindrical portion 13A. As shown in FIG. 7, a recess 13C opened in the −Z direction is formed in the interior of the cylindrical portion 13A.

The fitting axis C is an axis passing through the center of the cylindrical portion 13A and extending in the fitting direction of the connector 11 and the counter connector.

While the cylindrical portion 13A has a circular cylindrical shape, the cross-sectional shape thereof is not limited to a circular shape and may be various cross-sectional shapes such as an ellipse and a polygon as long as the cylindrical portion has the recess 13C in its interior.

Each of the four plug contacts 13 can be used as a terminal for transmitting an electric signal.

The sheet-like conductive member 15 has a multilayer structure in which a plurality of wiring layers each formed of a flexible conductor and a plurality of insulating layers are stacked.

Figure 8:
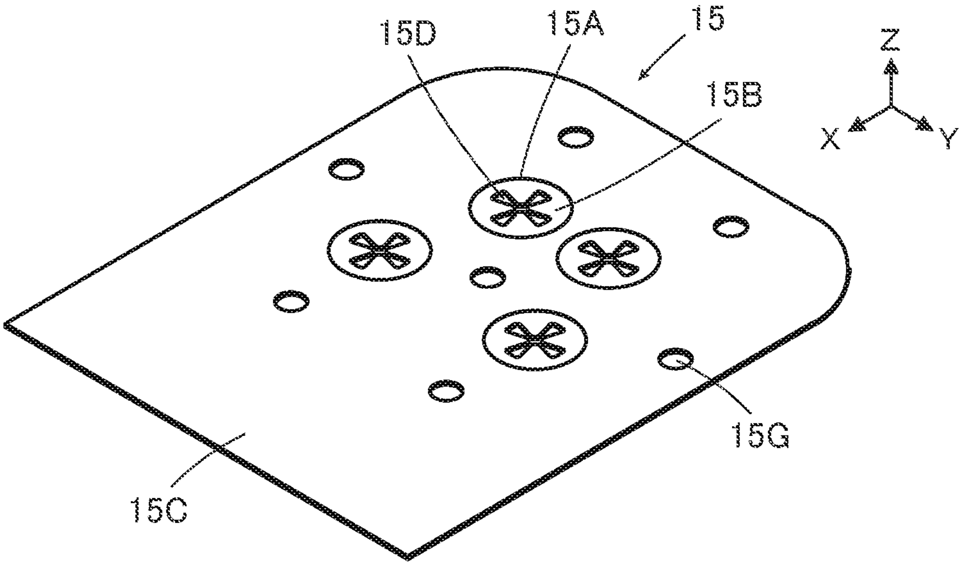
FIG. 8 is a perspective view of a connection target to be connected to the connector of Embodiment 1 as viewed obliquely from above.

As shown in FIG. 8, four contact placement regions 15A for placing the four plug contacts 13 are defined on the surface oriented in the +Z direction of the sheet-like conductive member 15. A wiring layer 15B is exposed in the +Z direction in each of the four contact placement regions 15A, and an insulating layer 15C is exposed in the region other than the four contact placement regions 15A.

A plurality of cutouts 15D penetrating the sheet-like conductive member 15 in the Z direction are formed in the four contact placement regions 15A. Since the cutouts 15D penetrate the sheet-like conductive member 15 in the Z direction, as shown in FIG. 9, the cutouts 15D are seen in positions corresponding to the four contact placement regions 15A also on the back surface oriented in the −Z direction of the sheet-like conductive member 15.

On the back surface oriented in the −Z direction of the sheet-like conductive member 15, a wiring layer 15E is exposed toward the −Z direction in each of positions corresponding to the four contact placement regions 15A, and an insulating layer 15F is exposed in the region other than the contact placement regions 15A.

Figure 9:
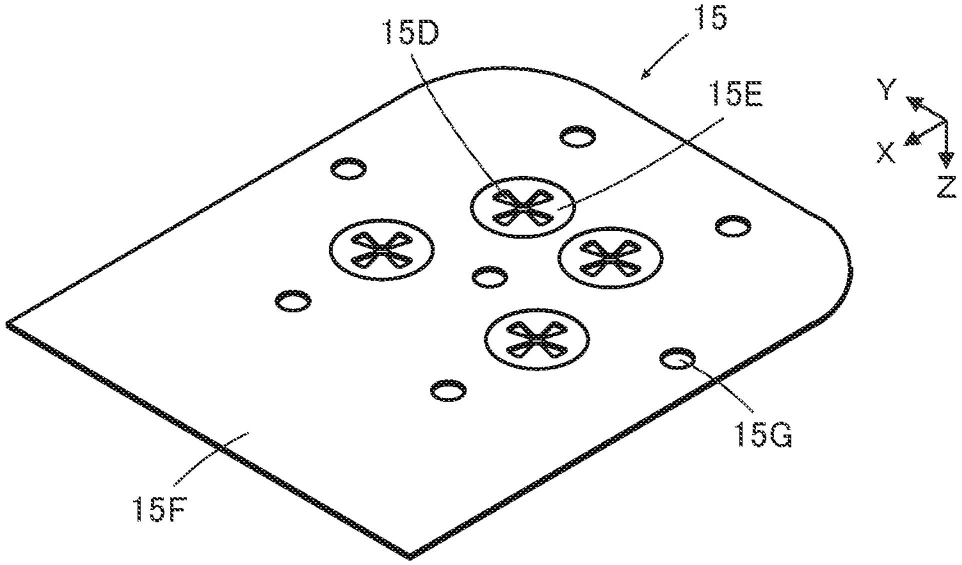
FIG. 9 is a perspective view of the connection target to be connected to the connector of Embodiment 1 as viewed obliquely from below.

As shown in FIGS. 8 and 9, a plurality of through holes 15G corresponding to the plurality of bosses 16C of the top insulator 16 are formed in a peripheral edge portion of the sheet-like conductive member 15.

Figure 10:
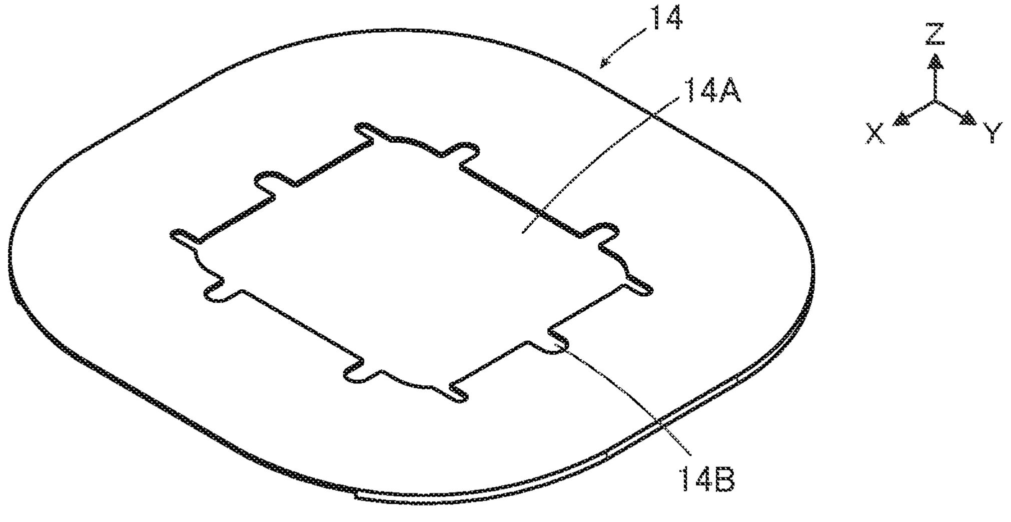
FIG. 10 is a perspective view showing a reinforcing sheet used for the connector of Embodiment 1.

As shown in FIG. 10, the reinforcing sheet 14 is for reinforcing a not-illustrated mounting target such as a garment on which the connector 11 is mounted, and is made of an insulating material and has an opening 14A formed at the center. A plurality of notches 14B corresponding to the plurality of bosses 16C of the top insulator 16 are formed along the peripheral edge of the opening 14A of the reinforcing sheet 14.

Figure 11:
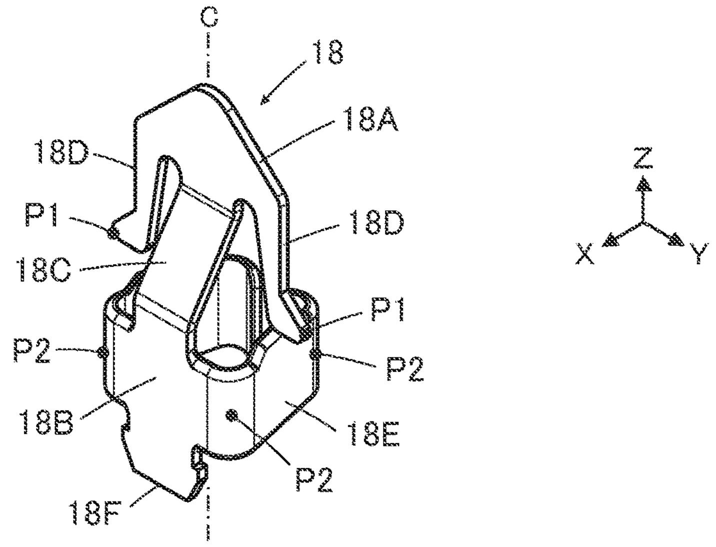
FIG. 11 is a perspective view showing an inner contact used for the connector of Embodiment 1.
Figure 12:
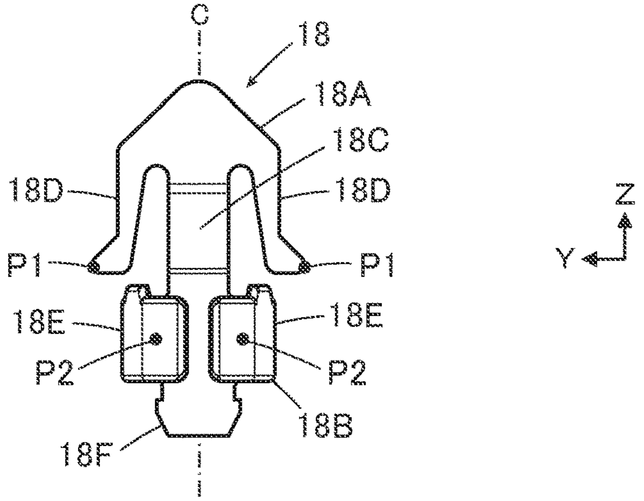
FIG. 12 is a front view showing the inner contact used for the connector of Embodiment 1.
Figure 13:
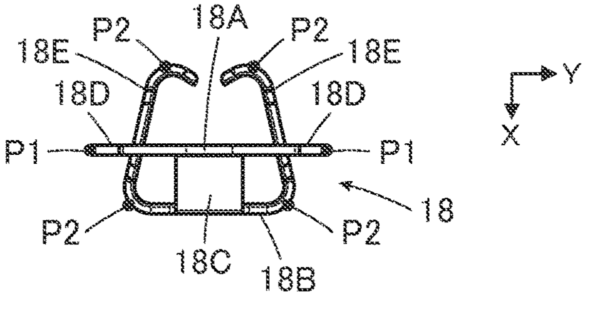
FIG. 13 is a plan view showing the inner contact used for the connector of Embodiment 1.

FIGS. 11 to 13 show a configuration of the inner contact 18. The inner contact 18 is formed of a bent plate member formed of a conductive material such as metal, and has a first constituent portion 18A placed in an end portion in the +Z direction of the inner contact 18 along the fitting axis C, a second constituent portion 18B placed on the −Z direction side of the first constituent portion 18A, and a coupling portion 18C that couples the first constituent portion 18A and the second constituent portion 18B such that the first constituent portion 18A and the second constituent portion 18B are apart from each other along the fitting axis C.

The first constituent portion 18A has a flat shape extending along the YZ plane, and has a pair of cantilever portions 18D separately on both sides of the fitting axis C across the fitting axis C, which cantilever portions 18D extend in the −Z direction and of which the distal ends extend in opposite directions to each other in the Y direction.

The second constituent portion 18B has a pair of arm portions 18E that extend from the connection portion with the coupling portion 18C while bending or curving in the −X direction to face each other in the Y direction in the XY plane in such a manner as to form a substantially cylindrical shape surrounding the fitting axis C. Distal end portions of the pair of arm portions 18E are close to each other and face each other in the Y direction.

The coupling portion 18C is inclined in the X direction with respect to the fitting axis C and couples the first constituent portion 18A and the second constituent portion 18B such that the second constituent portion 18B is located on the −Z direction side of the first constituent portion 18A.

The distal ends oriented in opposite directions to each other of the pair of cantilever portions 18D of the first constituent portion 18A form a pair of contact portions P1 that are elastically displaceable in the Y direction orthogonal to the fitting axis C.

Further, the outer surfaces of the pair of arm portions 18E of the second constituent portion 18B form a plurality of pressing portions P2 that are elastically displaceable in the XY plane orthogonal to the fitting axis C. Specifically, as shown in FIG. 13, the second constituent portion 18B has a substantially trapezoidal contour when viewed in the Z direction, and four pressing portions P2 are formed on the outer surfaces of the arm portions 18E at the four vertices of the trapezoid.

Here, the first constituent portion 18A and the second constituent portion 18B are placed to be apart from each other in the Z direction via the coupling portion 18C, and the four pressing portions P2 of the second constituent portion 18B are configured to be elastically displaceable independently of the elastic displacement of the pair of contact portions P1 of the first constituent portion 18A. That is, one of the elastic deformation in the contact portion P1 and the elastic deformation in the pressing portion P2 does not affect the other.

The inner contact 18 further has a fixing portion 18F protruding in the −Z direction from the second constituent portion 18B.

Such an inner contact 18 can be easily produced by, for example, bending a metal plate cut in a predetermined shape.

The spacing in the Y direction between the pair of contact portions P1 is set slightly larger than the inner diameter of a portion of the recess 13C of the plug contact 13, with which portion the pair of contact portions P1 come into contact when the inner contact 18 is inserted into the recess 13C.

Therefore, when the inner contact 18 is inserted into the recess 13C of the plug contact 13, the pair of contact portions P1 come into contact with the inner surface of the recess 13C with a predetermined contact pressure while being elastically displaced in directions toward the fitting axis C.

The distance between the fitting axis C and each pressing portion P2 in the XY plane is set to be slightly larger than a value obtained by subtracting the thickness of the sheet-like conductive member 15 from ½ of the inner diameter of a portion of the recess 13C of the plug contact 13 with which portion the four pressing portions P2 come into contact when the inner contact 18 is inserted into the recess 13C.

Therefore, when the inner contact 18 is inserted into the recess 13C of the plug contact 13 while pushing the sheet-like conductive member 15 therein, each of the four pressing portions P2 is elastically displaced in a direction toward the fitting axis C, and presses the sheet-like conductive member 15 against the inner surface of the recess 13C with a predetermined contact pressure.

Figure 14:
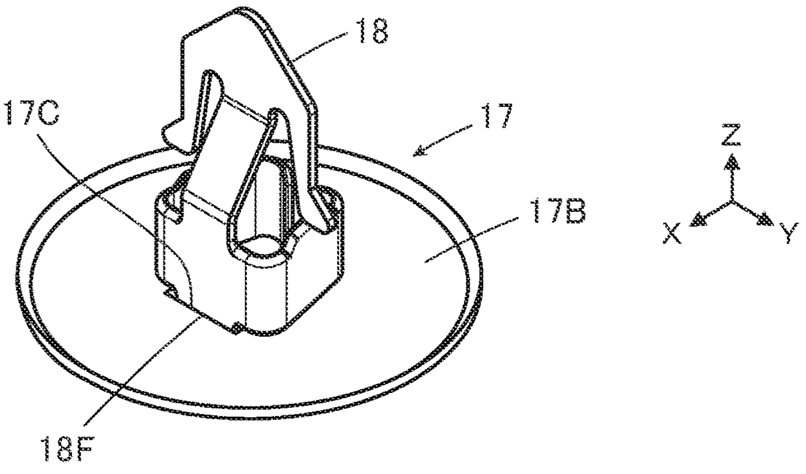
FIG. 14 is a perspective view showing the inner contact in Embodiment 1 held on the bottom insulator.

As shown in FIG. 14, the inner contact 18 is held on the bottom insulator 17 by inserting the fixing portion 18F into the holding hole 17C of the corresponding recess 17B of the bottom insulator 17.

The four contact through holes 16B of the top insulator 16, the four plug contacts 13, the four contact placement regions 15A of the sheet-like conductive member 15, the four inner contacts 18, and the four recesses 17B of the bottom insulator 17 are placed to be aligned with each other in the Z direction.

Further, the plurality of bosses 16C of the top insulator 16, the plurality of notches 14B of the reinforcing sheet 14, the plurality of through holes 15G of the sheet-like conductive member 15, and the plurality of through holes 17D of the bottom insulator 17 are placed to be aligned with each other in the Z direction.

When assembling the connector 11, first, as shown in FIG. 14, the fixing portion 18F of each inner contact 18 is inserted into the holding hole 17C of the corresponding recess 17B of the bottom insulator 17, whereby the inner contact 18 is held on the bottom insulator 17.

Next, the plurality of bosses 16C of the top insulator 16 are inserted into the plurality of notches 14B of the reinforcing sheet 14. At this time, the four contact through holes 16B of the top insulator 16 are located in the opening 14A of the reinforcing sheet 14.

Further, the cylindrical portion 13A of the plug contact 13 is inserted into the corresponding one of the four contact through holes 16B of the top insulator 16 from the −Z direction, and the bottom insulator 17 is pressed in the +Z direction toward the top insulator 16 with the sheet-like conductive member 15 being interposed therebetween.

At this time, the flange 13B of each plug contact 13 is located on the corresponding contact placement region 15A of the sheet-like conductive member 15, and each inner contact 18 held on the bottom insulator 17 is inserted into the recess 13C of the corresponding plug contact 13 while pushing the contact placement region 15A of the sheet-like conductive member 15.

Since the plurality of cutouts 15D are formed in each of the four contact placement regions 15A of the sheet-like conductive member 15, each of the four inner contacts 18 is inserted into the recess 13C of the plug contact 13 while opening the plurality of cutouts 15D of the corresponding contact placement region 15A.

By pressing the bottom insulator 17 against the top insulator 16, the plurality of bosses 16C of the top insulator 16 sequentially penetrate the plurality of notches 14B of the reinforcing sheet 14, the plurality of through holes 15G of the sheet-like conductive member 15, and the plurality of through holes 17D of the bottom insulator 17. Then, the distal ends of the plurality of bosses 16C protruding on the −Z direction side of the bottom insulator 17 are thermally deformed, whereby the top insulator 16 and the bottom insulator 17 are fixed to each other; thus, the assembly of the connector 11 is completed.

Each plug contact 13 is fixed to the top insulator 16 and the bottom insulator 17 by the flange 13B being sandwiched between the top insulator 16 and the bottom insulator 17.

Figure 15:
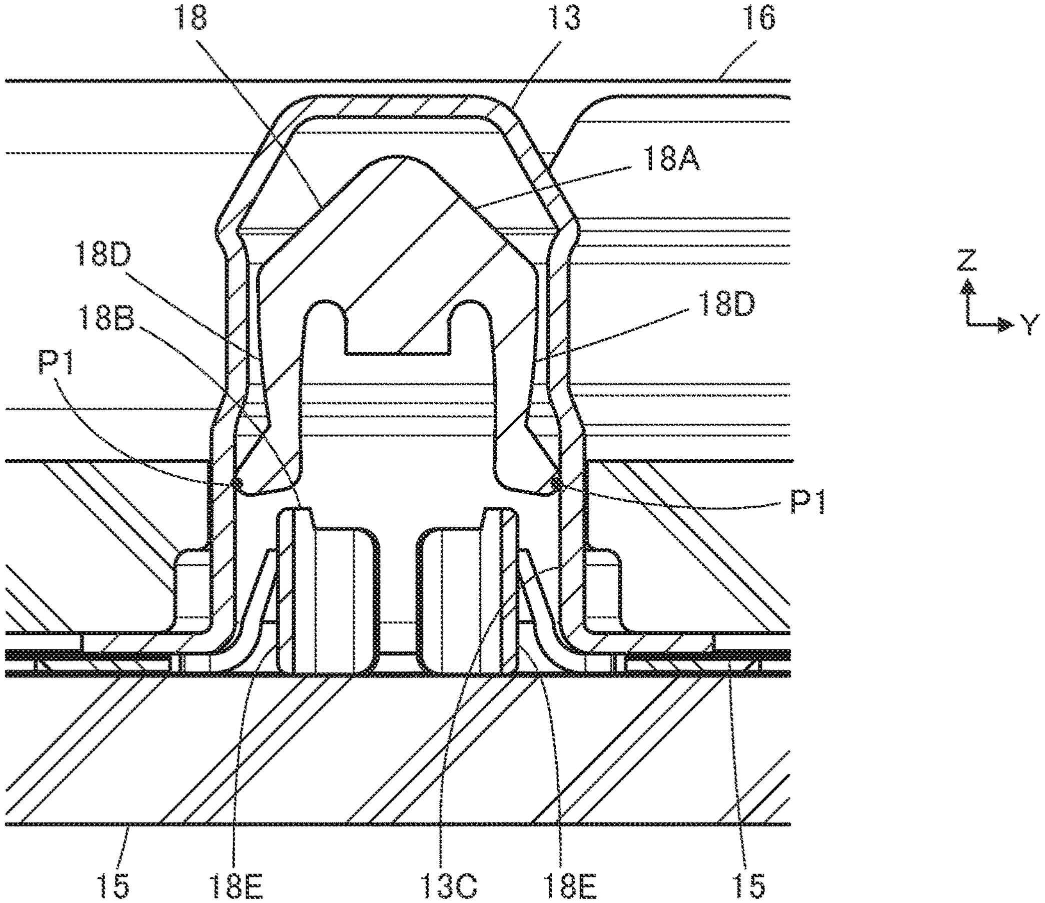
FIG. 15 is a partial side cross-sectional view showing an internal state of the plug contact into which the inner contact is inserted in the connector of Embodiment 1 connected to the connection target.

As shown in FIG. 15, the first constituent portion 18A of the inner contact 18 is inserted into a deep portion in the recess 13C of the plug contact 13, that is, on the +Z direction side in the recess 13C, and the pair of contact portions P1 formed in the pair of cantilever portions 18D of the first constituent portion 18A are pressed against the inner surface of the recess 13C of the plug contact 13; thus, the inner contact 18 is electrically connected to the plug contact 13.

Figure 16:
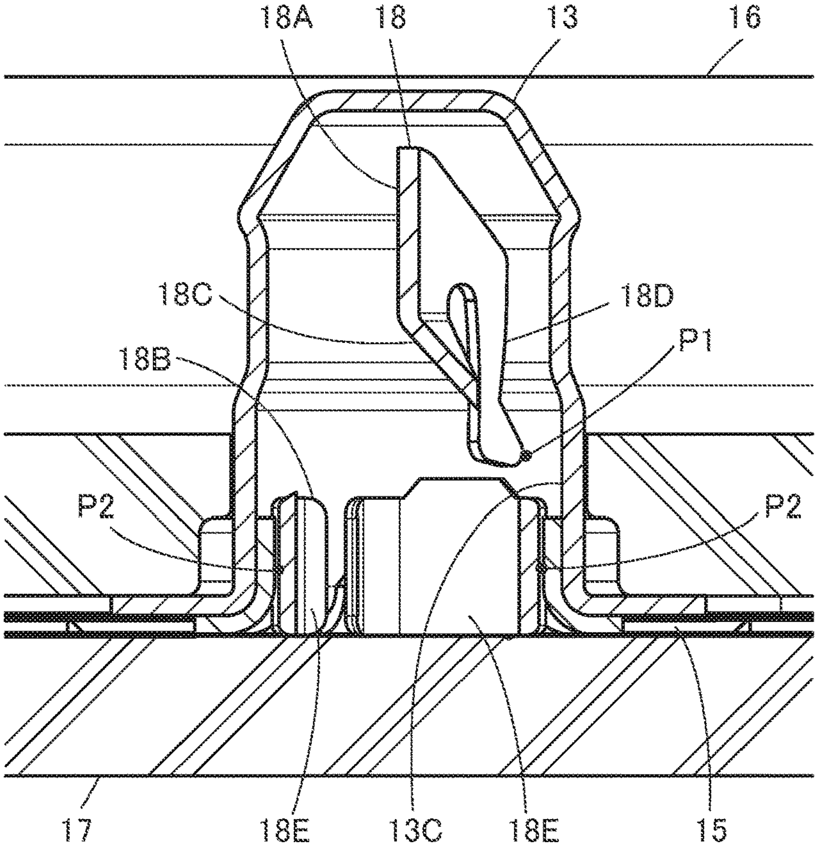
FIG. 16 is a partial side cross-sectional view of the internal state of the plug contact into which the inner contact is inserted in the connector of Embodiment 1 connected to a connection target, as viewed from a side different from that in FIG. 15.

Further, as shown in FIG. 16, the second constituent portion 18B placed on the −Z direction side of the first constituent portion 18A via the coupling portion 18C is inserted on the side nearer to an opening end portion of the recess 13C of the plug contact 13 than the first constituent portion 18A, that is, on the −Z direction side in the recess 13C. The sheet-like conductive member 15 pushed into the recess 13C of the plug contact 13 by the inner contact 18 is pressed toward the inner surface of the recess 13C of the plug contact 13 by the pressing portions P2 formed in the pair of arm portions 18E of the second constituent portion 18B of the inner contact 18.

Figure 17:
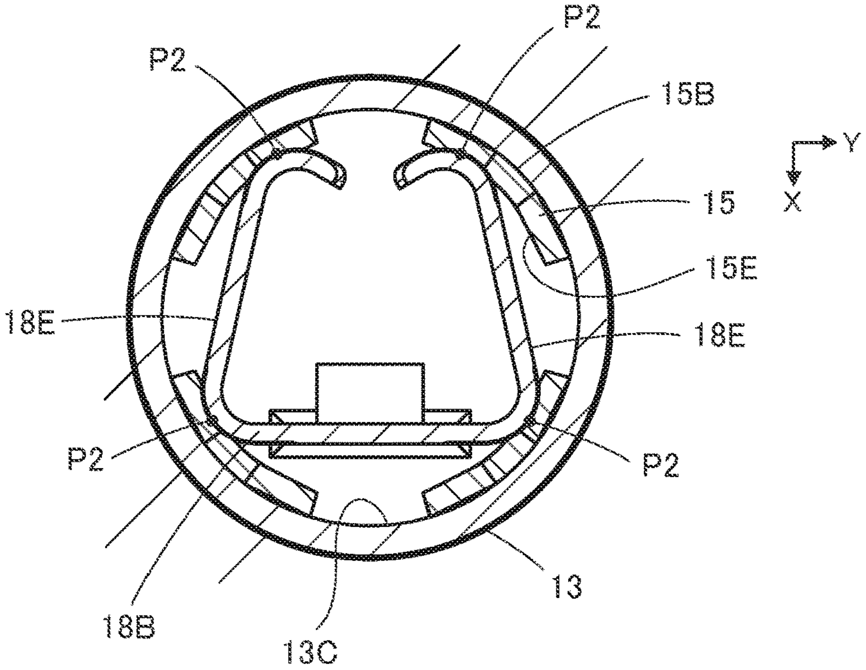
FIG. 17 is a partial plan cross-sectional view showing the internal state of the plug contact into which the inner contact is inserted in the connector of Embodiment 1 connected to the connection target.

Specifically, as shown in FIG. 17, the sheet-like conductive member 15 is pressed against the inner surface of the recess 13C of the plug contact 13 by the four pressing portions P2 of the second constituent portion 18B having a substantially trapezoidal contour when viewed in the Z direction.

Here, as shown in FIGS. 8 and 9, the wiring layer 15B is exposed in the contact placement region 15A on the front surface of the sheet-like conductive member 15, and the wiring layer 15E is exposed in a position corresponding to the contact placement region 15A on the back surface of the sheet-like conductive member 15.

Therefore, the wiring layer 15B on the front surface of the sheet-like conductive member 15 comes into contact with the inner surface of the recess 13C of the plug contact 13 with a predetermined contact pressure, and the wiring layer 15E on the back surface of the sheet-like conductive member 15 comes into contact with the pressing portion P2 of the inner contact 18 with a predetermined contact pressure.

Accordingly, the wiring layer 15B exposed on the front surface of the sheet-like conductive member 15 is directly electrically connected to the plug contact 13, and the wiring layer 15E exposed on the back surface of the sheet-like conductive member 15 is electrically connected to the plug contact 13 via the inner contact 18. That is, both the wiring layers 15B and 15E are connected to the plug contact 13.

Thus, in the connector 11, by using the inner contact 18, both the wiring layer 15B made of a flexible conductor placed on the front surface side of the sheet-like conductive member 15 and the wiring layer 15E made of a flexible conductor placed on the back surface side can be electrically connected to one plug contact 13.

Therefore, when the connector 11 is connected to a sheet-like conductive member in which a flexible conductor is exposed only on the front surface side, the plug contact 13 can be electrically connected to the flexible conductor on the front surface side of the sheet-like conductive member, and when the connector 11 is connected to a sheet-like conductive member in which a flexible conductor is exposed only on the back surface side, the plug contact 13 can be electrically connected to the flexible conductor on the back surface side of the sheet-like conductive member.

Further, when the connector 11 is connected to a sheet-like conductive member in which a flexible conductor is exposed on each of the front surface side and the back surface side like the sheet-like conductive member 15 in Embodiment 1, the plug contact 13 can be electrically connected to both the flexible conductor on the front surface side and the flexible conductor on the back surface side of the sheet-like conductive member. For example, in a case where the connection target is a sheet-like conductive member of a multilayer structure in which a flexible conductor forming a shield layer is exposed on each of the front surface side and the back surface side, and a flexible conductor forming a signal wiring layer is stacked between the shield layers while being insulated from both the shield layers, the plug contact 13 connected to the shield layers on the front surface side and the back surface side is connected to the ground potential, whereby a shielding effect is exerted on the signal wiring layer, and high-accuracy signal transmission can be performed with the influence of disturbance due to electromagnetic waves or the like being suppressed.

While in the connector 11 of Embodiment 1, the reinforcing sheet 14 is placed between the bottom insulator 17 and the top insulator 16, the reinforcing sheet 14 can be omitted when it is not necessary to reinforce a mounting target such as a garment to which the connector 11 is attached.

Embodiment 2

Figure 18:
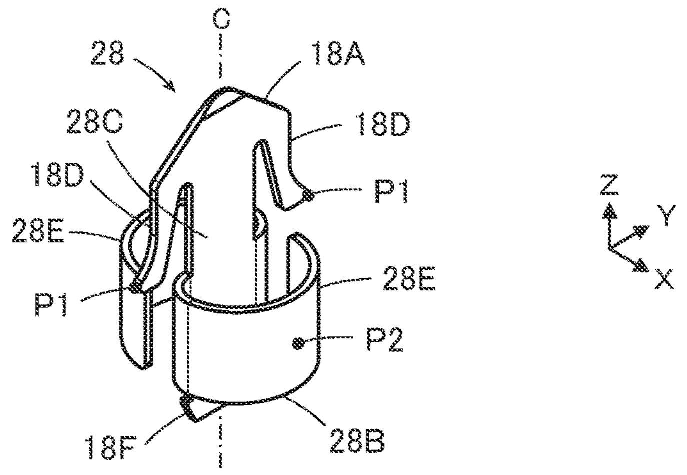
FIG. 18 is a perspective view showing an inner contact in Embodiment 2.
Figure 19:
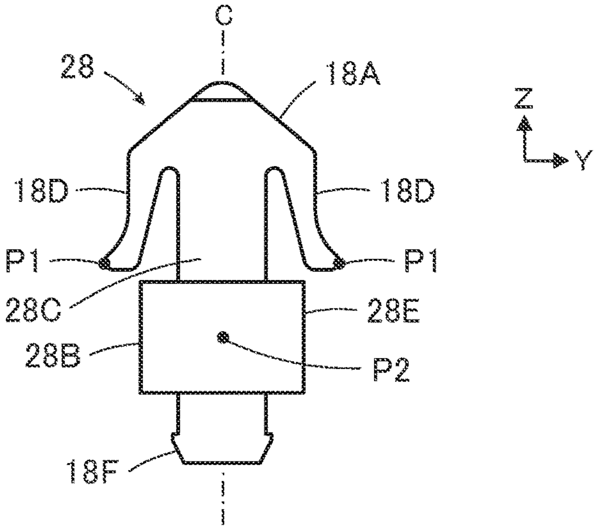
FIG. 19 is a front view showing the inner contact in Embodiment 2.
Figure 20:
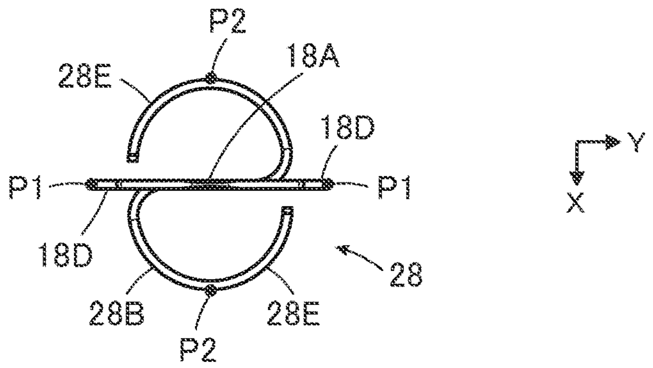
FIG. 20 is a plan view showing the inner contact in Embodiment 2.
Figure 21:
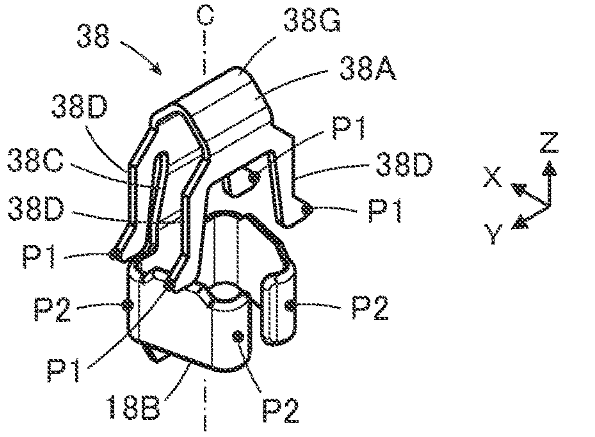
FIG. 21 is a perspective view showing an inner contact in Embodiment 3.
Figure 22:
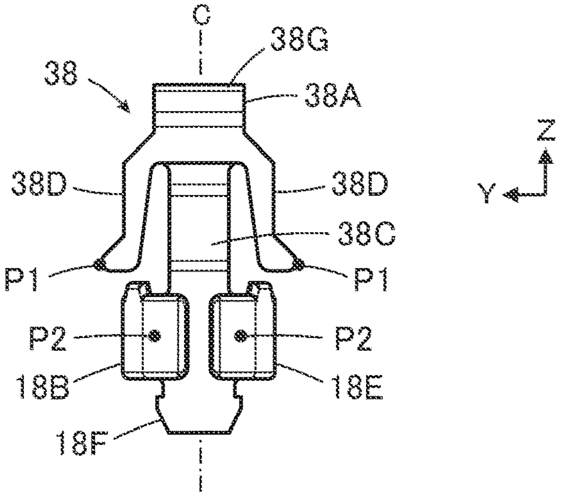
FIG. 22 is a front view showing the inner contact in Embodiment 3.
Figure 23:
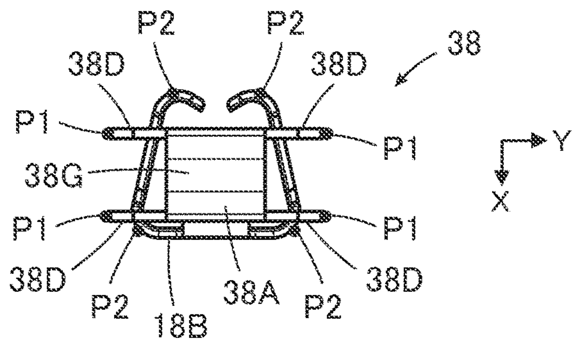
FIG. 23 is a plan view showing the inner contact in Embodiment 3.
Figure 24:
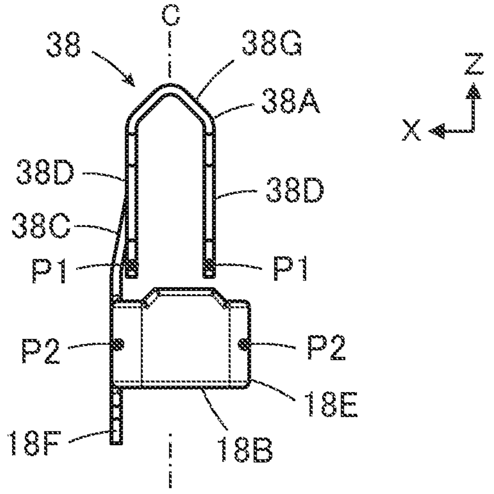
FIG. 24 is a side view showing the inner contact in Embodiment 3.

FIGS. 18 to 20 show an inner contact 28 used in a connector according to Embodiment 2. The inner contact 28 uses a second constituent portion 28B and a coupling portion 28C instead of the second constituent portion 18B and the coupling portion 18C in the inner contact 18 used in Embodiment 1 and shown in FIGS. 11 to 13, and the other configurations are the same as those of the inner contact 18. That is, in the inner contact 28, the second constituent portion 28B is coupled to the first constituent portion 18A via the coupling portion 28C.

The second constituent portion 28B has a pair of arm portions 28E that extend from both end portions in the Y direction of a connection portion connected with the coupling portion 28C while curving in the same rotational direction in the XY plane in such a manner as to form a substantially circular cylindrical shape surrounding the fitting axis C.

The outer surfaces of the pair of arm portions 28E of the second constituent portion 28B form a pair of pressing portions P2 that are elastically displaceable in the XY plane orthogonal to the fitting axis C.

The coupling portion 28C has a flat plate shape along the YZ plane, and couples the first constituent portion 18A and the second constituent portion 28B such that the second constituent portion 28B is located apart from the first constituent portion 18A on the −Z direction side.

In this manner, the pressing portion P2 of the second constituent portion 28B is configured to be elastically displaceable independently of the elastic displacement of the pair of contact portions P1 of the first constituent portion 18A.

When the inner contact 28 of such a configuration is inserted into the recess 13C of the plug contact 13 while pushing the sheet-like conductive member 15 therein, the pair of contact portions P1 of the first constituent portion 18A are pressed against the inner surface of the recess 13C of the plug contact 13 and the inner contact 28 is electrically connected to the plug contact 13, and the sheet-like conductive member 15 pushed into the recess 13C is pressed toward the inner surface of the recess 13C of the plug contact 13 by the pair of pressing portions P2 of the inner contact 28.

Therefore, also when the inner contact 28 shown in FIGS. 18 to 20 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

While in FIGS. 18 to 20, the pressing portion P2 is shown only in a central portion of the outer surface of each arm portion 28E of the second constituent portion 28B, it is also possible to configure such that the sheet-like conductive member 15 is pressed toward the inner surface of the recess 13C of the plug contact 13 with pressing portions P2 that are formed in band shapes along outer peripheral portions of a pair of arm portions 28E forming a substantially circular cylindrical shape.

Embodiment 3

FIGS. 21 to 24 show an inner contact 38 used in a connector according to Embodiment 3. The inner contact 38 uses a first constituent portion 38A and a coupling portion 38C instead of the first constituent portion 18A and the coupling portion 18C in the inner contact 18 used in Embodiment 1 and shown in FIGS. 11 to 13, and the other configurations are the same as those of the inner contact 18. That is, in the inner contact 38, the second constituent portion 18B is coupled to the first constituent portion 38A via the coupling portion 38C.

The first constituent portion 38A has two pairs of cantilever portions 38D that are arranged to face each other with a space therebetween in the X direction with each cantilever portion 38D extending along the YZ plane. The two pairs of cantilever portions 38D are coupled to each other via a curved portion 38G curved in a U-shape to open in the −Z direction, and each pair of cantilever portions 38D has a similar structure to the pair of cantilever portions 18D of the first constituent portion 18A of the inner contact 18 in Embodiment 1.

The distal ends of the two pairs of cantilever portions 38D of the first constituent portion 38A form two pairs of contact portions P1 that are elastically displaceable in the Y direction orthogonal to the fitting axis C.

The coupling portion 38C couples the first constituent portion 38A and the second constituent portion 18B while being inclined in the X direction with respect to the fitting axis C such that the second constituent portion 18B is located apart from the first constituent portion 38A on the −Z direction side.

In this manner, the two pairs of contact portions P1 of the first constituent portion 38A are configured to be elastically displaceable independently of the elastic displacement of the four pressing portions P2 of the second constituent portion 18B.

When the inner contact 38 of such a configuration is inserted into the recess 13C of the plug contact 13 while pushing the sheet-like conductive member 15 therein, the two pairs of contact portions P1 of the first constituent portion 38A are pressed against the inner surface of the recess 13C of the plug contact 13 and the inner contact 38 is electrically connected to the plug contact 13, and the sheet-like conductive member 15 pushed into the recess 13C is pressed toward the inner surface of the recess 13C of the plug contact 13 with the four pressing portions P2 of the inner contact 38.

Therefore, also when the inner contact 38 shown in FIGS. 21 to 24 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

When the inner contact 38 in Embodiment 3 is used, the four contact portions P1 formed in the two pairs of cantilever portions 38D of the first constituent portion 38A come into contact with the inner surface of the recess 13C of the plug contact 13, and therefore the reliability of the electrical connection between the inner contact 38 and the plug contact 13 is improved.

Embodiment 4

Figure 25:
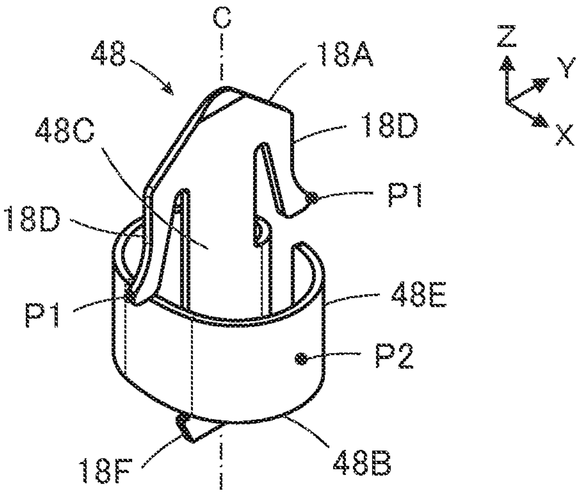
FIG. 25 is a perspective view showing an inner contact in Embodiment 4.
Figure 26:
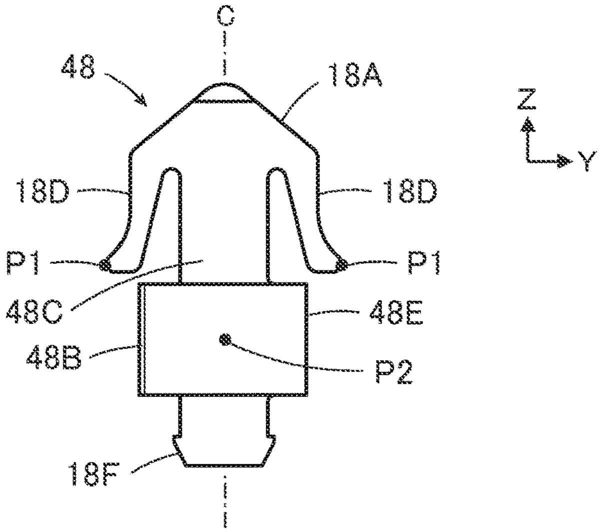
FIG. 26 is a front view showing the inner contact in Embodiment 4.
Figure 27:
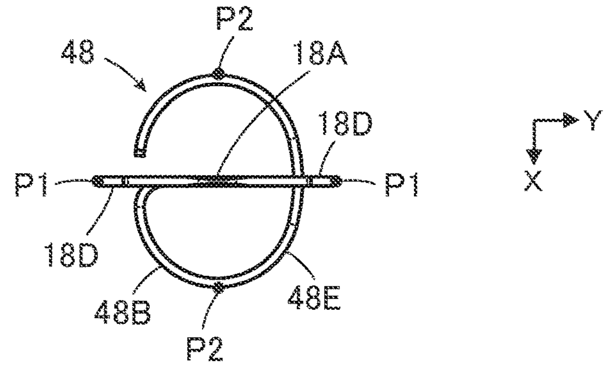
FIG. 27 is a plan view showing the inner contact in Embodiment 4.

FIGS. 25 to 27 show an inner contact 48 used in a connector according to Embodiment 4. The inner contact 48 uses a second constituent portion 48B and a coupling portion 48C instead of the second constituent portion 18B and the coupling portion 18C in the inner contact 18 used in Embodiment 1 and shown in FIGS. 11 to 13, and the other configurations are the same as those of the inner contact 18. That is, in the inner contact 48, the second constituent portion 48B is coupled to the first constituent portion 18A via the coupling portion 48C.

The second constituent portion 48B has one arm portion 48E that extends from an end portion in the +Y direction of the connection portion connected with the coupling portion 48C while curving in the XY plane in such a manner as to form a substantially circular cylindrical shape surrounding the fitting axis C.

The outer surface of the one arm portion 48E of the second constituent portion 48B forms a pair of pressing portions P2 that are elastically displaceable in the XY plane orthogonal to the fitting axis C.

The coupling portion 48C has a flat plate shape along the YZ plane, and couples the first constituent portion 18A and the second constituent portion 48B such that the second constituent portion 48B is located apart from the first constituent portion 18A on the −Z direction side.

In this manner, the pressing portion P2 of the second constituent portion 48B is configured to be elastically displaceable independently of the elastic displacement of the pair of contact portions P1 of the first constituent portion 18A.

When the inner contact 48 of such a configuration is inserted into the recess 13C of the plug contact 13 while pushing the sheet-like conductive member 15 therein, the pair of contact portions P1 of the first constituent portion 18A are pressed against the inner surface of the recess 13C of the plug contact 13 and the inner contact 48 is electrically connected to the plug contact 13, and the sheet-like conductive member 15 pushed into the recess 13C is pressed toward the inner surface of the recess 13C of the plug contact 13 with the pair of pressing portions P2 of the inner contact 48.

Therefore, also when the inner contact 48 shown in FIGS. 25 to 27 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

While in FIGS. 25 to 27, the pressing portion P2 is shown only at a most +X directional point and a most −X directional point on the outer surface of the arm portion 48E of the second constituent portion 48B, it is also possible to configure such that the sheet-like conductive member 15 is pressed toward the inner surface of the recess 13C of the plug contact 13 with a pressing portion P2 that is formed in a band shape along an outer peripheral portion of an arm portion 48E forming a substantially circular cylindrical shape.

Embodiment 5

Figure 28:
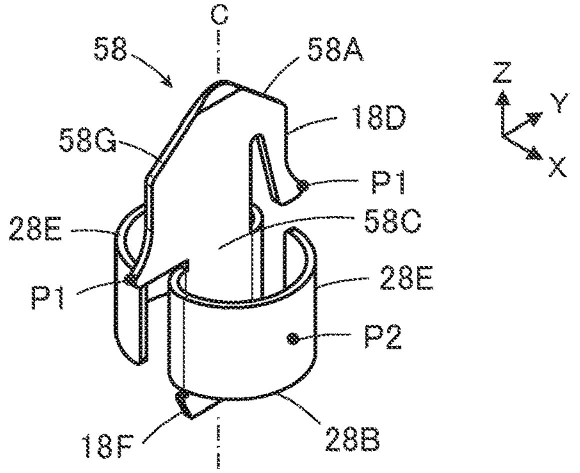
FIG. 28 is a perspective view showing an inner contact in Embodiment 5.
Figure 29:
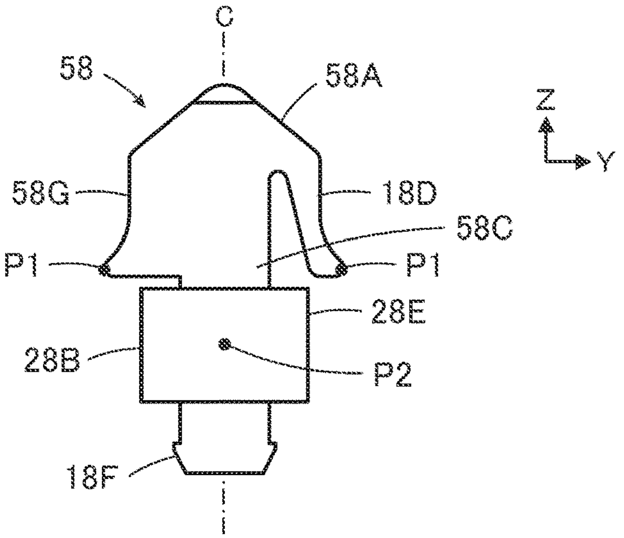
FIG. 29 is a front view showing the inner contact in Embodiment 5.
Figure 30:
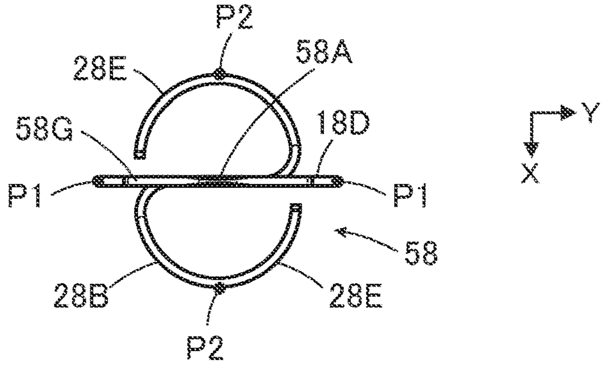
FIG. 30 is a plan view showing the inner contact in Embodiment 5.

FIGS. 28 to 30 show an inner contact 58 used in a connector according to Embodiment 5. The inner contact 58 uses a first constituent portion 58A and a coupling portion 58C instead of the first constituent portion 18A and the coupling portion 28C in the inner contact 28 used in Embodiment 2 and shown in FIGS. 18 to 20, and the other configurations are the same as those of the inner contact 28. That is, in the inner contact 58, the second constituent portion 28B is coupled to the first constituent portion 58A via the coupling portion 58C.

The first constituent portion 58A has a flat shape extending along the YZ plane, and has one cantilever portion 18D that extends in the −Z direction on the +Y direction side of the fitting axis C with the distal end thereof extending in the +Y direction and a flat plate portion 58G extending along the YZ plane on the −Y direction side of the fitting axis C.

The cantilever portion 18D is the same as the cantilever portion 18D of the first constituent portion 18A of the inner contact 28 used in Embodiment 2 and has its distal end extending in the +Y direction, and the flat plate portion 58G has its distal end extending in the −Y direction at the −Z directional end.

A contact portion P1 is formed at each of the distal end extending in the +Y direction of the cantilever portion 18D and the distal end extending in the −Y direction of the flat plate portion 58G. Due to elastic deformation of the cantilever portion 18D having a shape extending in the −Z direction, the pair of contact portions P1 formed at the distal end of the cantilever portion 18D and the distal end of the flat plate portion 58G can be elastically displaced mutually in the Y direction orthogonal to the fitting axis C.

The coupling portion 58C has a flat plate shape along the YZ plane, and couples the first constituent portion 58A and the second constituent portion 28B such that the second constituent portion 28B is located apart from the first constituent portion 58A on the −Z direction side.

In this manner, the pressing portion P2 of the second constituent portion 28B is configured to be elastically displaceable independently of the elastic displacement of the pair of contact portions P1 of the first constituent portion 58A.

When the inner contact 58 of such a configuration is inserted into the recess 13C of the plug contact 13 while pushing the sheet-like conductive member 15 therein, the pair of contact portions P1 of the first constituent portion 58A are pressed against the inner surface of the recess 13C of the plug contact 13 and the inner contact 58 is electrically connected to the plug contact 13, and the sheet-like conductive member 15 pushed into the recess 13C is pressed toward the inner surface of the recess 13C of the plug contact 13 with the pair of pressing portions P2 of the inner contact 58.

Therefore, also when the inner contact 58 shown in FIGS. 28 to 30 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

While in FIGS. 28 to 30, the pressing portion P2 is shown only in a central portion of the outer surface of each arm portion 28E of the second constituent portion 28B, it is also possible to configure such that the sheet-like conductive member 15 is pressed toward the inner surface of the recess 13C of the plug contact 13 with pressing portions P2 that are formed in band shapes along outer peripheral portions of a pair of arm portions 28E forming a substantially circular cylindrical shape.

Embodiment 6

Figure 31:
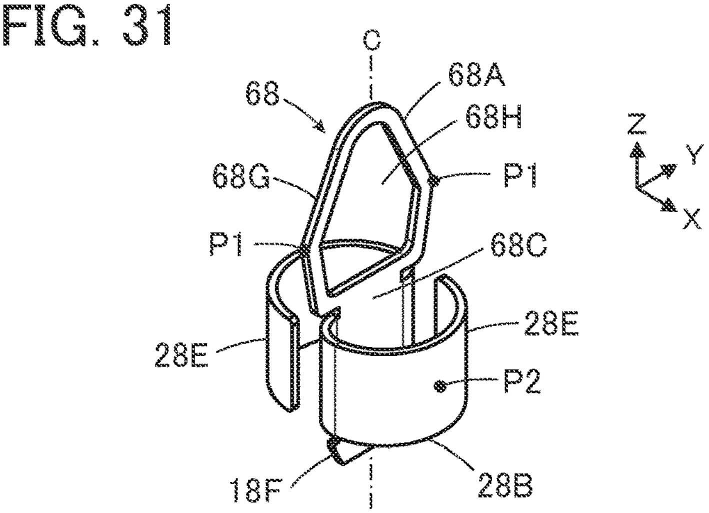
FIG. 31 is a perspective view showing an inner contact in Embodiment 6.
Figure 32:
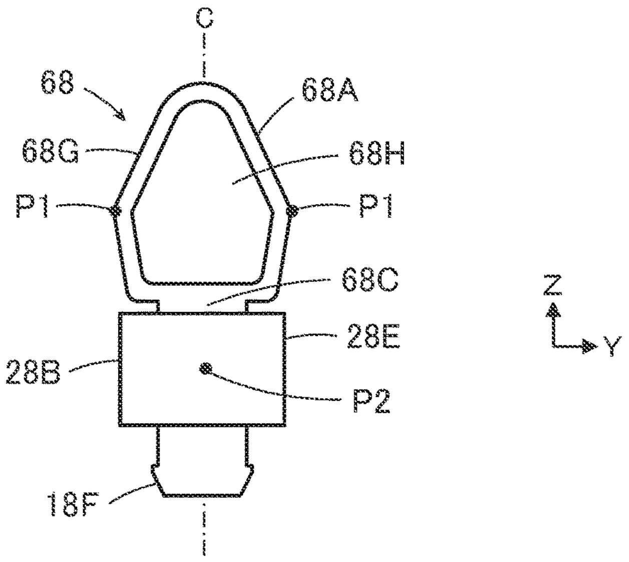
FIG. 32 is a front view showing the inner contact in Embodiment 6.
Figure 33:
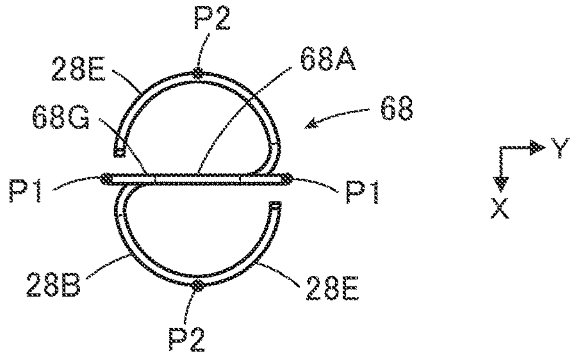
FIG. 33 is a plan view showing the inner contact in Embodiment 6.

FIGS. 31 to 33 show an inner contact 68 used in a connector according to Embodiment 6. The inner contact 68 uses a first constituent portion 68A and a coupling portion 68C instead of the first constituent portion 18A and the coupling portion 28C in the inner contact 28 used in Embodiment 2 and shown in FIGS. 18 to 20, and the other configurations are the same as those of the inner contact 28. That is, in the inner contact 68, the second constituent portion 28B is coupled to the first constituent portion 68A via the coupling portion 68C.

The first constituent portion 68A has a double supported beam portion 68G extending in both the Y direction orthogonal to the fitting axis C and the +Z direction along the fitting axis C in the YZ plane. The double supported beam portion 68G extends along the circumference of an opening 68H located in the fitting axis C such that the double supported beam portion 68G surrounds the opening 68H, and both ends of the double supported beam portion 68G are connected to the +Y directional end and the −Y directional end of a base portion of the first constituent portion 68A connected to the coupling portion 68C. A pair of contact portions P1 oriented in opposite directions to each other in the Y direction are formed in the double supported beam portion 68G. Each of the contact portions P1 is configured to be elastically displaceable in the Y direction with elastic deformation of the double supported beam portion 68G.

The coupling portion 68C has a flat plate shape along the YZ plane, and couples the first constituent portion 68A and the second constituent portion 28B such that the second constituent portion 28B is located apart from the first constituent portion 68A on the −Z direction side.

Thereby, the pressing portion P2 of the second constituent portion 28B is configured to be elastically displaceable independently of the elastic displacement of the pair of contact portions P1 of the first constituent portion 68A.

When the inner contact 68 of such a configuration is inserted into the recess 13C of the plug contact 13 while pushing the sheet-like conductive member 15 therein, the pair of contact portions P1 of the first constituent portion 68A are pressed against the inner surface of the recess 13C of the plug contact 13 and the inner contact 68 is electrically connected to the plug contact 13, and the sheet-like conductive member 15 pushed into the recess 13C is pressed toward the inner surface of the recess 13C of the plug contact 13 with the pair of pressing portions P2 of the inner contact 68.

Therefore, also when the inner contact 68 shown in FIGS. 31 to 33 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

Although in FIGS. 31 to 33 the pressing portion P2 is shown only in a central portion of the outer surface of each arm portion 28E of the second constituent portion 28B, it is also possible to configure such that the sheet-like conductive member 15 is pressed toward the inner surface of the recess 13C of the plug contact 13 by pressing portions P2 that are formed in band shapes along outer peripheral portions of a pair of arm portions 28E forming a substantially circular cylindrical shape.

Embodiment 7

Figure 34:
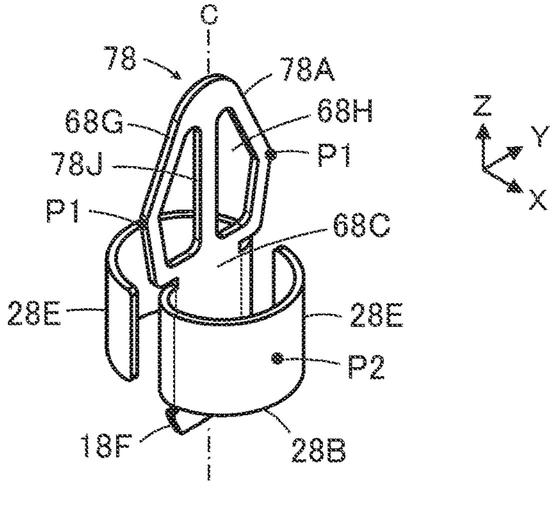
FIG. 34 is a perspective view showing an inner contact in Embodiment 7.
Figure 35:
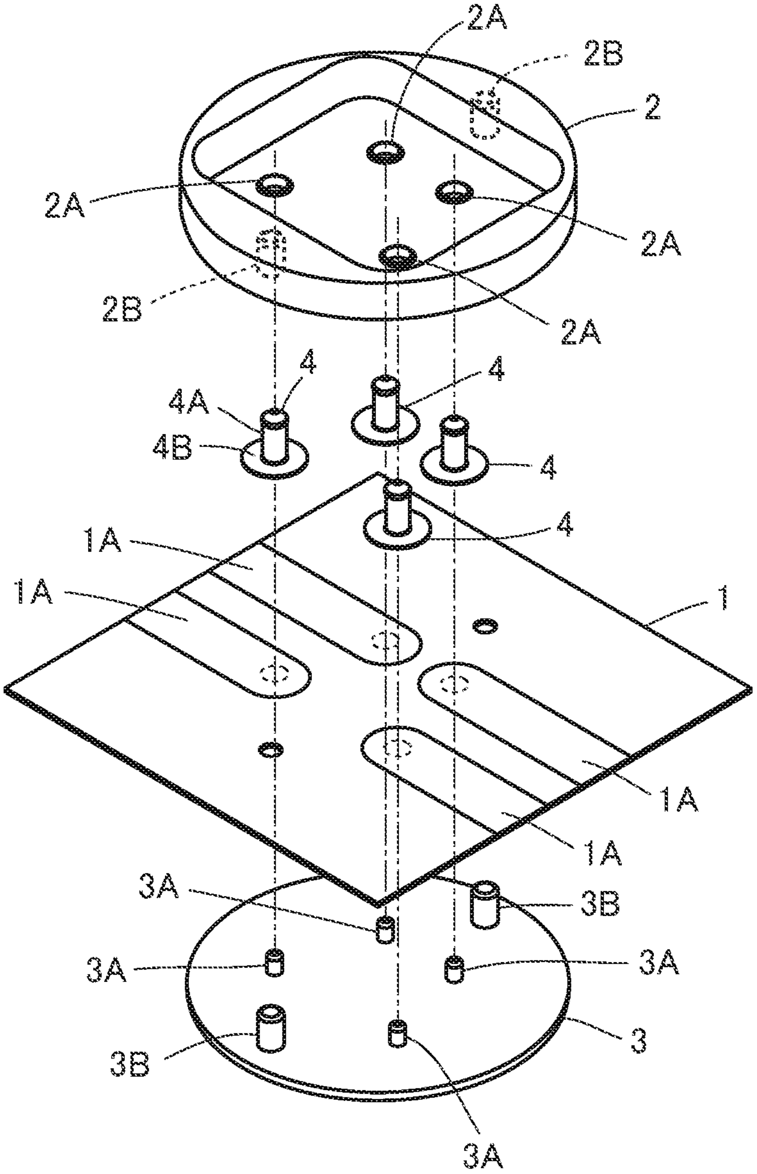
FIG. 35 PRIOR ART
FIG. 35 is an exploded perspective view of a conventional connector.
Figure 36:
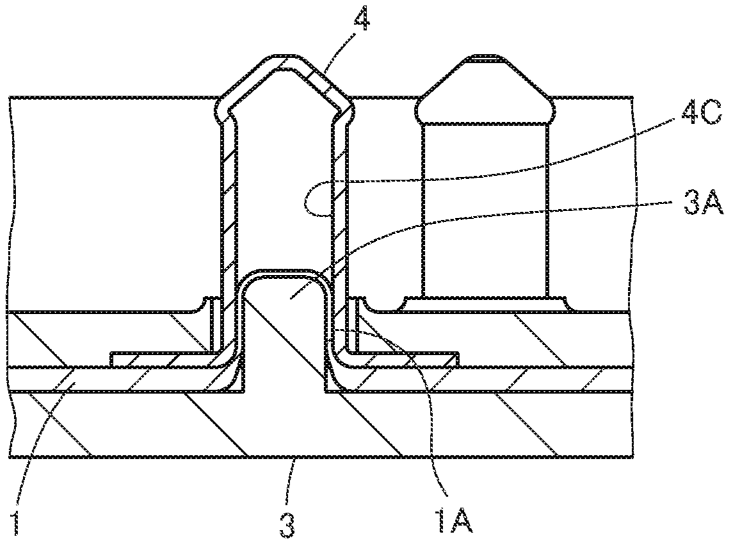
FIG. 36 PRIOR ART
FIG. 36 is a partial cross-sectional view showing the conventional connector.

FIG. 34 shows an inner contact 78 used in a connector according to Embodiment 7. The inner contact 78 uses a first constituent portion 78A instead of the first constituent portion 68A in the inner contact 68 used in Embodiment 6 and shown in FIGS. 31 to 33, and the other configurations are the same as those of the inner contact 68. That is, in the inner contact 78, the second constituent portion 28B is coupled to the first constituent portion 78A via the coupling portion 68C.

The first constituent portion 78A is configured such that an auxiliary coupling portion 78J is formed in the double supported beam portion 68G in the first constituent portion 68A of the inner contact 68 in Embodiment 6. The auxiliary coupling portion 78J extends along the fitting axis C to divide the opening 68H surrounded by the double supported beam portion 68G into two in the Y direction, and couples a base portion of the first constituent portion 78A connected to the coupling portion 68C and the +Z directional end of the double supported beam portion 68G.

A contact portion P1 that is elastically displaceable in the Y direction is formed in each of a portion of the double supported beam portion 68G located on the +Y direction side of the auxiliary coupling portion 78J and a portion of the double supported beam portion 68G located on the −Y direction side of the auxiliary coupling portion 78J.

Also when the inner contact 78 shown in FIG. 34 is used instead of the inner contact 18 in the connector 11 according to Embodiment 1, similarly both the wiring layer 15B placed on the front surface side of the sheet-like conductive member 15 and the wiring layer 15E placed on the back surface side of the sheet-like conductive member 15 can be electrically connected to the plug contact 13.

In Embodiments 1 to 7 above, the plug contact 13 placed in the contact placement region 15A of the sheet-like conductive member 15 is connected to both the wiring layer 15B exposed on the front surface side of the sheet-like conductive member 15 and the wiring layer 15E exposed on the back surface side of the sheet-like conductive member 15; meanwhile, for example, it is also possible to configure such that only the wiring layer 15E exposed on the back surface side of the sheet-like conductive member 15 is connected to the plug contact 13 placed in the contact placement region 15A.

While the sheet-like conductive member 15 used in Embodiments 1 to 7 above has a multilayer structure, the sheet-like conductive member is not limited thereto, and may have any structure as long as it has a flexible conductor exposed on at least one surface.

Further, while in Embodiments 1 to 7 above, the two layers of flexible conductors of the wiring layer 15B and the wiring layer 15E of the sheet-like conductive member 15 are connected to one plug contact 13, the configuration is not limited thereto, and three or more layers of flexible conductors may be connected to one plug contact 13.

Further, while the connector 11 according to Embodiments 1 to 7 above includes four plug contacts 13, the configuration is not limited to this number of plug contacts 13, and may be any configuration as long as it includes at least one plug contact 13 to be electrically connected to a flexible conductor exposed on at least one surface of the sheet-like conductive member 15.

What is claimed is:

1. A connector comprising:

a plug contact of cylindrical shape, the plug contact being conductive and having a recess extending along a fitting axis; and an inner contact formed of a plate member, the inner contact being conductive and inserted into the recess, wherein the plate member includes:

a first constituent portion including a contact portion that is elastically displaceable in a direction orthogonal to the fitting axis and that comes into contact with the plug contact in the recess;

a second constituent portion including a pressing portion that is elastically displaceable in a direction orthogonal to the fitting axis independently of elastic displacement of the contact portion of the first constituent portion; and a coupling portion that couples the first constituent portion and the second constituent portion such that the first constituent portion and the second constituent portion are apart from each other along the fitting axis, and part of a connection target of sheet-like shape in which a flexible conductor is exposed on at least one surface is sandwiched between the pressing portion and an inner surface of the recess in a direction orthogonal to the fitting axis, and the inner surface of the recess comes into contact with a front surface of the connection target while the pressing portion comes into contact with a back surface of the connection target, whereby the plug contact is directly electrically connected to the flexible conductor in a case where the flexible conductor is exposed on the front surface of the connection target, and the plug contact is electrically connected to the flexible conductor via the inner contact in a case where the flexible conductor is exposed on the back surface of the connection target.

2. The connector according to claim 1, wherein the plug contact has a cylindrical portion and a flange formed at one end of the cylindrical portion, and the recess is formed of an interior of the cylindrical portion.

3. The connector according to claim 2, comprising a housing for holding the connection target, the plug contact, and the inner contact, the housing having insulating property wherein the housing includes:

a top insulator provided with a contact through hole that is penetrated by the cylindrical portion of the plug contact and that is smaller than the flange; and a bottom insulator provided with a holding hole for holding the inner contact, and the top insulator is fixed to the bottom insulator such that the cylindrical portion of the plug contact penetrates the contact through hole and that the connection target and the flange are sandwiched between the top insulator and the bottom insulator.

4. The connector according to claim 1, wherein the second constituent portion is placed on a side nearer to an opening end portion of the recess than the first constituent portion.

5. The connector according to claim 4, wherein the first constituent portion has a cantilever portion placed on one side of the fitting axis and extending in a direction orthogonal to the fitting axis and a flat plate portion placed on another side of the fitting axis and extending in a direction orthogonal to the fitting axis, and the contact portion is formed at each of distal ends of the cantilever portion and the flat plate portion.

6. The connector according to claim 4, wherein the first constituent portion has at least two cantilever portions separately arranged on both sides of the fitting axis across the fitting axis, the cantilever portions each extending in a direction orthogonal to the fitting axis, and the contact portion is formed at each of distal ends of the at least two cantilever portions.

7. The connector according to claim 6, wherein the first constituent portion has two pairs of the cantilever portions, the two pairs being coupled to each other and arranged to face each other.

8. The connector according to claim 4, wherein the first constituent portion has a double supported beam portion extending in both a direction orthogonal to the fitting axis and a direction along the fitting axis, and a pair of contact portions oriented in opposite directions to each other in a direction orthogonal to the fitting axis are formed in the double supported beam portion.

9. The connector according to claim 8, wherein the first constituent portion has an auxiliary coupling portion that extends along the fitting axis and that couples a distal end portion of the double supported beam portion and a base portion of the first constituent portion in a direction along the fitting axis.

10. The connector according to claim 4, wherein the second constituent portion has at least one arm portion bent or curved around the fitting axis, and the pressing portion is formed on an outer surface oriented in a direction orthogonal to the fitting axis of the at least one arm portion.

11. The connector according to claim 10, wherein the second constituent portion has a pair of arm portions bent or curved in opposite directions to each other.

* * * * *